UNITED STATES PATENT OFFICE 2,390,092

SUBSTITUTED 1,3,5-TRIAZINYL-(6)-AMINO-PHENYL-ARSENIC COMPOUNDS

Ernst A. H. Friedheim, New York, N. Y.

No Drawing. Application June 3, 1944,
Serial No. 538,697

7 Claims. (Cl. 260—242)

This invention relates to derivatives of triazines containing arsenic, and more particularly to triazine derivatives which contain trivalent arsenic.

In my U. S. Patent No. 2,295,574 issued on September 15, 1942, I have shown that condensation of suitable derivatives of symmetric triazine with phenyl-arsonic acid derivatives results in a new type of condensation products possessing valuable therapeutic properties in diseases caused by spirochaetes or trypanosomes, such as syphilis, and African sleeping sickness.

I have found that new triazine derivatives containing arsenic can be obtained by condensing derivatives of 1,3,5-triazine of the formula

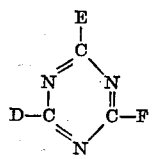

with an aromatic organic compound containing trivalent arsenic and corresponding to the formula W—C₆H₂(A B)—As=X.

In these formulas, W is an amino-group or halogen. If W is an amino-group, at least one of the groups D, E, F, is a halogen-group. If W is a halogen, at least one of the groups D, E, F is an amino-group. In both cases the other groups are selected from the group consisting of halogen, NH₂, NH. Alk.. N Alk.₂, hydroxy-alkyl-amino, NHCH₂CHOHCH₂OH, dialkyl-amino-alkyl-amino, and aminoacyl radicals, such as NHCOCH₃ and NHCOC₆H₅; the radicals A and B are selected from the group consisting of hydrogen, halogen, OH, O Alk., O acyl, NO₂, NH₂, NH Alk., N Alk.₂, aminoacyl, and alkyl radicals, X is a divalent group selected from the group consisting of O, S, dihalides, such as Cl₂, I₂ or Br₂, and sulfur-containing radicals of the type =(S—R)₂ wherein R is an organic radical which is capable of carrying a SH-radical. Such sulfur-containing reactants are, for example, thioglycolic acid, cysteine, or glutathione, thiophenol. As examples of the trivalent arsenic compounds to be used according to my invention, the following may be mentioned: 4-amino-phenylarsinoxide, 4-chlorphenyl-arsinoxide, 4-amino-phenyl-arsindichloride, 4-amino-phenyl-arsinsulfide, 3-amino-4-oxy-phenylarsinoxide.

The condensation products thus formed have the formula

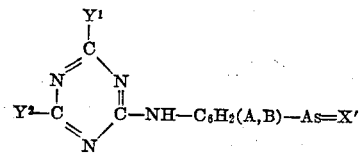

wherein Y¹ and Y² are each a radical selected from the group consisting of halogen, NH₂, NH Alk., N Alk.₂, hydroxy-alkyl-amino,

NHCH₂CHOHCH₂OH dialkyl-amino-alkyl-amino, and aminoacyl radicals; A and B are selected from the group consisting of hydrogen, halogen, OH, O Alk., O acyl, NO₂, NH₂, NH Alk., N Alk.₂, amino-acyl, and alkyl radicals, and X' is a divalent radical selected from the group consisting of O, S, dihalides. sulfur-containing groups of the type =(S—R)₂, wherein R is an organic radical which is capable of carrying a SH-radical, and groups having the formula

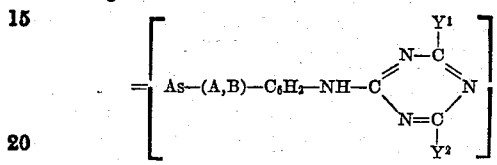

In carrying out the present invention, for example an aqueous solution containing one mol of 4-oxy-3-amino-phenyl-arsinoxide may be caused to react with a fine suspension of 1 mol of 2,4,6-trichloro-1,3,5-triazine in water at a temperature of 0° C. with the exclusion of oxygen. The resulting condensation product has the formula

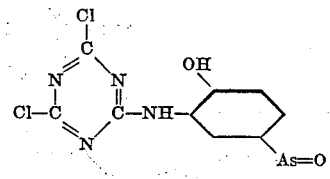

Subsequently, this reaction product may be treated with a base selected from the group consisting of ammonia, alkyl amines, hydroxy-alkyl amines and dialkyl-amino-alkyl amines. Similar reactions may be obtained by using a dihalide such as 4-amino-phenylarsindichloride instead of 4-oxy-3-amino-phenylarsinoxide. Instead of the latter, its derivatives or isomers, such as, for instance, 2-oxy-4-amino-phenyl-arsinoxide, or 4-amino-3-oxy-phenylarsinoxide may also be used. In carrying out these reactions, instead of the trichloro-triazine other derivatives of 1,3,5-triazine corresponding to the formula referred to above may also be used.

I have further found that the condensation products according to this invention may also be obtained by first forming a condensation product of the type disclosed in my above mentioned U. S. Patent No. 2,295,574 from a derivative of 1,3,5-triazine and a substituted phenyl-arsonic acid, and converting the condensation product thus obtained, into a compound containing trivalent arsenic. I have found that such conversion can be performed without the disintegration of the basic triazinyl-aminobenzene structure by treating the triazinyl-aminobenzene-arsonic acid condensation product in hydrochloric acid solution, in the presence of hydriodic acid, with SO₂, hypophosphorous acid (H₂PO₃), or stannous chloride, or in neutral or alkaline solution with phenylhydrazine or sodium hydrosulfite (Na₂S₂O₄). The reduction with SO₂ or phenylhydrazine leads to the arsinoxides, or dihalogenarsines, while the treatment with stannous chloride, hypophosphorous acid, and sodium hydrosulfite leads to the corresponding arseno-compounds.

For example, one part by weight of 2,4-diamino-1,3,5 - triazinyl - (6) - [amino - 3 - oxy - 4-phenylarsonic acid I] is dissolved at about 80° C. in 100 parts of hydrochloric acid of sp. gr. 1.19. To the clear, warm solution 1/50 part of sodium iodide is added, and a stream of SO₂ gas is allowed to pass through the solution. After a few minutes the solution becomes cloudy, and the hydrochloride of 2,4-diamino-1,3,5-triazinyl-(6)-oxyaminophenylarsindichloride separates out in crystalline form. It is soluble in ethyl alcohol from which it may be recrystallized. It is slightly soluble in acetone, and insoluble in chloroform, CCl₄ and benzene. The corresponding arsinoxide is formed by the action of alkali, such as dilute ammonia or sodium bicarbonate on the arsindichloride.

An arseno-compound can be obtained by the action of stannous chloride on 2,4-diamino-triazinyl-(6)-[4-oxy-3-aminophenylarsonic acid I]. One part of the latter is suspended in 50 parts of aqueous hydrochloric acid of 1.19 density containing about 50% stannous chloride, and 1% of hydriodic acid. On gentle warming the substance goes slowly into solution, the reaction mixture taking a yellow color. It becomes cloudy, and on standing a yellow precipitate separates, which represents the hydrochloride of the bis[2,2' - 4 - 4' - tetraamino - triazinyl -(6 - 6')]-3-3'-diamino-4-4' dioxyarseno-benzene of the formula

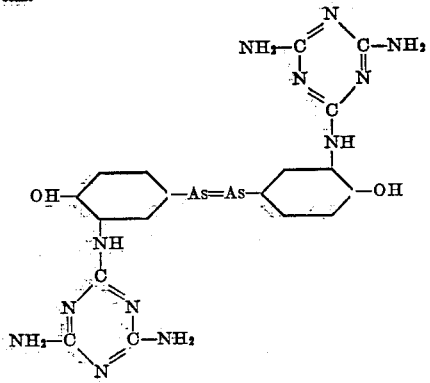

This compound is moderately soluble in dilute hydrochloric acid, and insoluble in ether and chloroform.

Other compounds according to my present invention may be obtained by applying the above described reduction processes to other arsono-anilino-triazine compounds, such as monochlor-monoamino-arsono-anilino-triazine, and other arsono-anilino-triazine compounds obtained according to my above mentioned U. S. Patent No. 2,295,574.

As described in Example 2 of my above mentioned U. S. Patent No. 2,295,574, p-[2,4-dichloro-1,3,5 - triazinyl - (6)] - aminophenylarsonic acid may be treated with ammonia in order to convert it into a 2-chloro-4-amino-compound by covering said dichloro-compound with 10 times the quantity of 10% aqueous ammonia, and shaking at 45° C. for 1 hour, whereby the product goes into complete solution. By heating the [2-chloro - 4 - amino - 1,3,5 - triazinyl - (6) ] - aminophenyl-arsonic compound in hydrochloric acid solution with SO₂, a compound of the formula

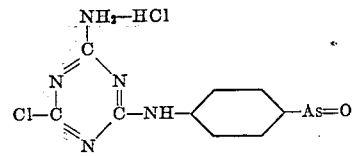

may be obtained.

By reacting an aqueous alkaline solution containing one mol of 3,5-dinitro-4-amino-phenylarsonic acid of the formula

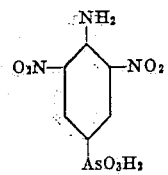

with a fine suspension of 1 mol of 2,4,6-trichloro-1,3,5-triazine in water at a temperature of 0° C., a condensation product corresponding to the formula

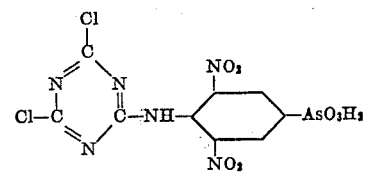

is obtained. This compound may be converted by reduction with stannous chloride in aqueous hydrochloric acid solution into a compound corresponding to the formula

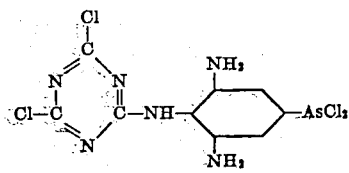

Similar compounds may be obtained by reacting other aminophenyl arsonic acids further substituted in the benzene ring by two amino groups or two nitro groups or by one amino and one nitro group, with cyanuric chloride in the above described manner and subjecting the resulting triazine derivative to reduction in hydrochloric acid solution by means of stannous chloride or by the action of SO₂ gas in the presence of hydriodic acid.

Reference is made to my co-pending application Ser. No. 422,234 filed on December 9, 1941, of which this is a continuation-in-part.

It is to be understood that in the above specification and the appended claims the term "amino radical" or "amino radicals" is used to include "—NH₂" radicals as well as the above disclosed substituted amino radicals.

I claim:
1. A 1,3,5-triazine derivative of the formula

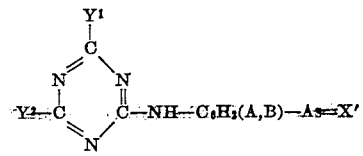

wherein Y¹ and Y² each represent a halogen, C₆ is a benzene ring, A and B are amino radicals, and X' is a divalent radical selected from the group consisting of O, S, and dihalides.

2. A 1,3,5-triazine derivative of the formula

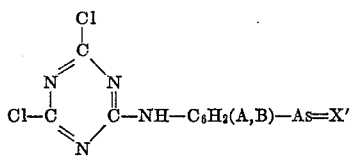

wherein C6 is a benzene ring, A and B are amino radicals, and X' is a divalent radical selected from the group consisting of O, S, and dihalides.

3. A 1,3,5-triazine derivative of the formula

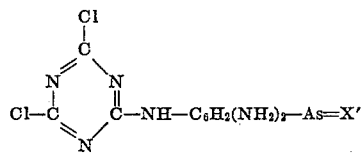

wherein C6 is a benzene ring, and X' is a divalent radical selected from the group consisting of O, S and dihalides.

4. A 1,3,5-triazine derivative of the formula

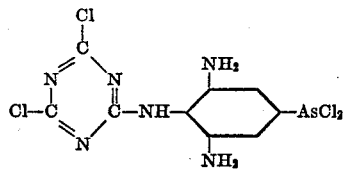

5. A process for preparing a 1,3,5-triazine derivative as claimed in claim 1, said process comprising reacting a compound of the formula $H_2N-C_6H_2(A',B')-AsO_3H_2$, wherein A' and B' are selected from the group consisting of nitro, and amino groups, with cyanuric chloride and subjecting the resulting condensation product to the action of a reducing agent.

6. A process for preparing a 1,3,5-triazine derivative as claimed in claim 1, said process comprising reacting a compound of the formula $H_2N-C_6H_2(A',B')-AsO_3H_2$, wherein A' and B' are selected from the group consisting of nitro, and amino groups, with cyanuric chloride and subjecting the resulting condensation product to reduction with stannous chloride in hydrochloric acid solution.

7. A process for preparing a 1,3,5-triazine derivative as claimed in claim 1, said process comprising reacting a compound of the formula $H_2N-C_6H_2(A',B')-AsO_3H_2$, wherein A' and B' are selected from the group consisting of nitro, and amino groups, with cyanuric chloride and subjecting the resulting condensation product to reduction by means of $SO_2$ gas in the presence of hydroiodic acid in hydrochloric acid solution.

ERNST A. H. FRIEDHEIM.